April 5, 1932.　　　　N. ROE　　　　1,852,190
SEARCHLIGHT TESTING ATTACHMENT
Filed Nov. 10, 1928
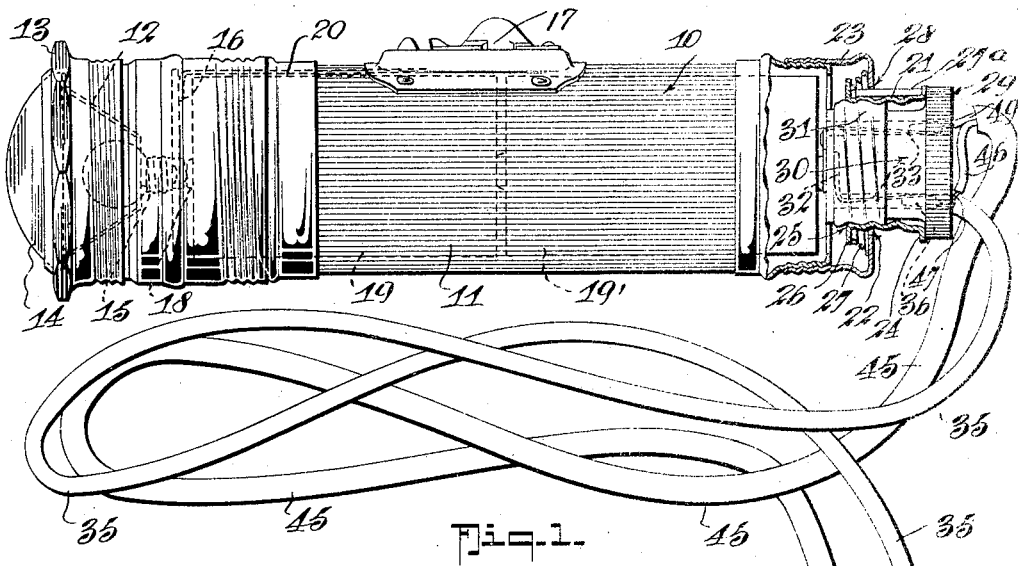
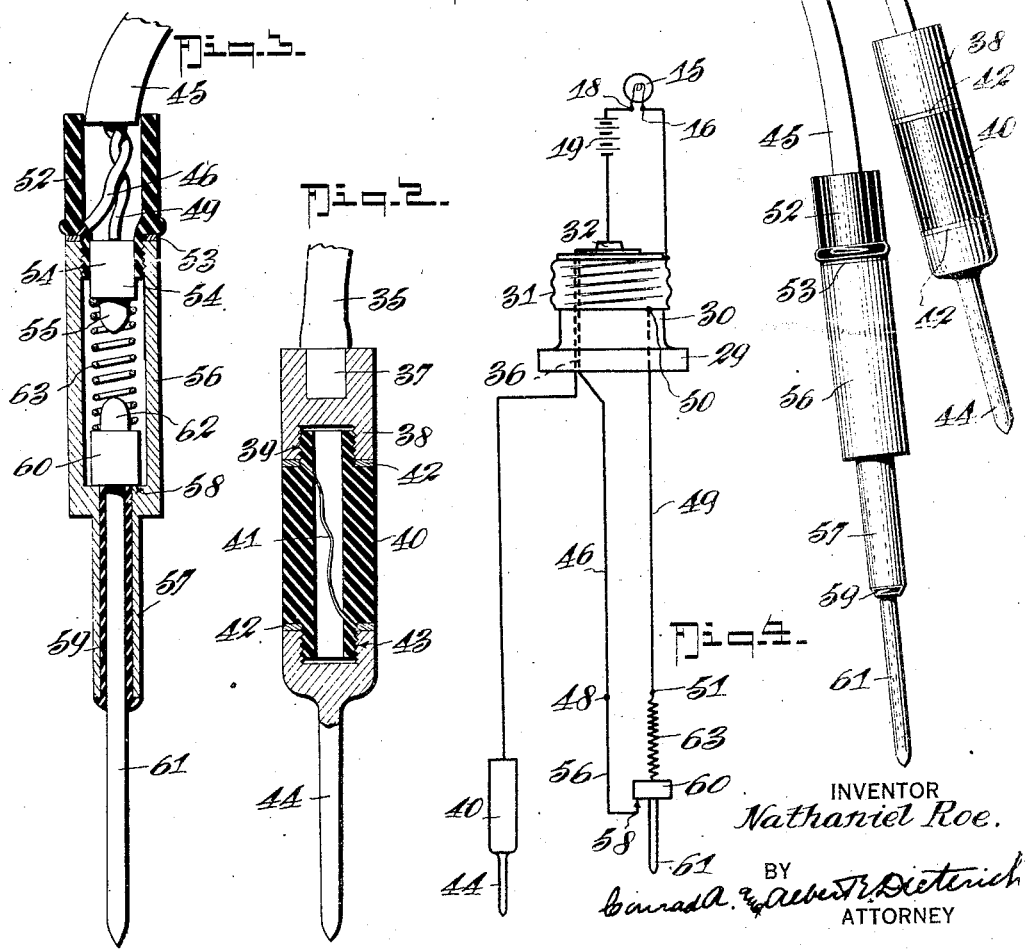
INVENTOR
Nathaniel Roe.
BY
Conrad A. & Albert R. Dieterich
ATTORNEY Patented Apr. 5, 1932

1,852,190

UNITED STATES PATENT OFFICE

NATHANIEL ROE, OF PATCHOGUE, NEW YORK

SEARCH-LIGHT TESTING ATTACHMENT

Application filed November 10, 1928. Serial No. 318,419.

My invention relates to improvements in means for adapting search-lights for the purpose of testing electrical instruments and circuits and the same has for its object to provide a simple, efficient and reliable portable device which is especially adapted for use in connection with the search-light and fuse tester that constitutes the subject matter of my application filed January 27, 1928, Serial No. 249,969.

Further, said invention has for its object to provide a device which may be left on the flash-light and which has a simple effective and convenient means to maintain a closed circuit through the device when the same is not being used for testing purposes.

Further, the invention has for an object to provide a device having means normally maintaining a closed circuit through the device whereby the flash-light may be used in the ordinary way and further whereby, when the device is being used for testing purposes, the circuit may be opened in the testing device during the act of testing, the opening being closed instantly, however, by the article being tested if its condition is correct; if the electrical continuity of the article being tested is broken, however, the flash-light will be extinguished to indicate that fact.

Other objects will in part be obvious and in part be pointed out hereinafter.

To the attainment of the aforesaid objects and ends my invention consists in the novel details of construction, connection and arrangement of parts hereinafter more fully described and then pointed out in the claims.

In the accompanying drawings showing an illustrative embodiment of the invention—

Figure 1 is a side elevation, partly broken away and in section, illustrating a flash-light with my invention embodied.

Figure 2 is an enlarged vertical longitudinal section of the relatively rigid testing needle and fuse carrier.

Figure 3 is an enlarged vertical longitudinal section of the circuit switching needle device.

Figure 4 is a diagram of the electric circuit connections of the attachment.

In the drawings, 10 designates a portable electric flash-light illustrating a common or well-known type of flash-light, and comprising a cylindrical casing 11 provided at one end with a reflector 12, and a cover 13 having a lens 14 therein. The reflector 12 is provided with a suitable lamp socket in which is secured an incandescent lamp 15. One terminal of said lamp 15 is in electric connection with one terminal 16 of a circuit closer 17 secured upon the outer side of the cylindrical casing 11. The other terminal of said lamp is in direct contact with the center terminal 18 of the two cell battery, the cells 19—19' of which are connected in series. The outer wall of the battery 19', which constitues the other terminal thereof, is in electrical communication with the other terminal 20 of the circuit closer 17 through a threaded sleeve member 21 which is movably disposed within an opening 22 provided in the screw-threaded cap or cover 23 which normally serves to seal the casing 11 and maintain the batteries 19, 19' duly positioned.

The sleeve member 21 is made of copper, brass or other suitable conducting material, and is provided at its outer end with a laterally extending peripheral flange 24, adapted to engage with the outer side of the cap or cover 23. The sleeve member 21 is provided at its inner end with an opening 25, and outwardly extending radial ears 26 which are stamped out or otherwise suitably secured to the inner end of a helical spring 27 serving to maintain the inner end of said sleeve member normally in engagement and electrical connection with the bottom wall of the battery 19'. The sleeve member 21 is provided with a pin 27a which is secured at one end adjacent to the inner end of said sleeve, and has its outer or free end extending loosely through an aperture 28 in said cap or cover 23 whereby to prevent rotary movement of said sleeve relative to said cap or cover.

29 denotes a plug of the ordinary construction having the insulating body 30, the externally threaded metal contact sleeve 31, the central terminal contact 32 and the usual spring finger contacts 33 located in openings in the insulating body 30. The construction of the plug, per se, does not constitute my invention but is well known at the present time.

In carrying out my invention I provide a flexible insulated conductor cable (single) 35, one end 36 of which is soldered or otherwise suitably secured to one of the contacts 33 of the plug 29 while its other end 37 is secured in good electrical contact in the socketed union 38 into which is screwed at 39 one end of a fused cartridge 40. The fuse cartridge 40 may be of any suitable construction, the one shown having contacting rings 42 between which the fuse 41 is secured.

The other end of the cartridge is screwed into the socketed end 43 of the contact needle 44.

A second cable 45 (double) is provided, one of the wires 46 of which has an end 47 connected with one of the plug contacts 33. The other wire 49 has an end 50 connected to the other plug contact 33. These connections may be made by soldering or in any other suitable way.

The wires 46 and 49 have their other ends secured respectively to a contact ring 53 and to a plug 54 carried by an insulating body 52. The body is secured by threads or otherwise to a metallic tube 56. The plug 54 has a nipple 55 to center and hold a spring 63 in place between such plug 54 and the head 60 of the needle 61. The head 60 also has a spring holding nipple 62 as shown.

The tube 56 is provided with a reduced bearing portion 57, bushed with insulation as at 59 and the same is so arranged that when the head 60 rests on the shoulder 58 electrical contact between needle 61 and tube 56 will be effectually established.

In use the plug 29 is screwed into the flash-light socket to connect the plug terminals in the flash-light circuit. This also establishes the circuit between the flash-light circuit proper and that of the present attachment.

Upon closing the usual switch on the flash-light current will normally flow from battery 18 through bulb 15, connections 16, 17, and 10 to threaded sleeve 21, and from thence via plug sleeve 31, contact 33 connected with sleeve 31 through wire 49 of cable 45, spring 63 to needle head 60 and return via tube 56, wire 46, plug contact 32 to battery 19.

If, now, needles 44 and 61 are brought into engagement with the part to be tested and tube 56 be pressed down the circuit will be broken between the head 60 and the shoulder 58; therefore should the circuit be open between the points of the needles 44 and 61, no current will flow and the bulb light will be extinguished. This indicates a defect in the part being tested.

While I have referred to the elements 36, 38, 51 and 54 as "needles" it is to be understood that that term is not to be held as limiting those elements to pointed bodies as simple rod-like members may be used as equivalents in many cases. The use of pointed rods (needles) however enables the said elements to pierce insulation and make contact to otherwise inaccessible conductors.

Having thus described my said invention, what I claim and desire to secure by Letters Patent is:

1. In testing apparatus wherein is provided a flash-light having a battery, a bulb and a switch all in electric circuit; an attachment comprising a pair of inflexible testing needles, means connecting said needles in normally closed circuit to and in the flash-light circuit, and means associated with one of said needles for opening the normally closed circuit to the flash-light when said needles are pressed into contact with a part-to-be-tested, which part has no electrical continuity between the places where said needles contact the same.

2. In testing apparatus, the combination with a flash-light which comprises a case, a battery, a bulb and a switch, all connected in a flash-light electric circuit; a testing attachment comprising a connector for connection to the flash-light and having a pair of circuit terminals electrically connected in the flash-light circuit, a testing needle, an electrical connection between said needle and one of said connector circuit terminals, a second and inflexible testing needle, electrical connections between said second needle and both said connector circuit terminals, and means associated with said second needle for opening the circuit upon applying said second needle with pressure to a part-to-be-tested.

3. In testing apparatus, the combination with a flash-light which comprises a case, a battery, a bulb and a switch, all connected in a flash-light electric circuit; a testing attachment comprising a connector for connection to the flash-light and having a pair of circuit terminals electrically connected in the flash-light circuit, a testing needle, an electrical connection between said needle and one of said connector circuit terminals, a second and inflexible testing needle, electrical connections between said second needle and both said connector circuit terminals, and a circuit breaker in said last named electrical connections functioning to open the circuit upon pressing said second needle onto a part-to-be-tested.

4. In combination with a flash-light of the type comprising a case, a bulb, a battery, a switch and an electric circuit including said battery, bulb and switch, and a circuit opening and closing socket device in said circuit; a testing attachment comprising a socket plug with contact terminals adapted upon insertion of the plug into the socket device to open the flash-light circuit and place said contact terminals therein, a first needle electrically connected with one of said contact terminals, a second and inflexible needle electrically connected with both said contact terminals, and means associated with said second needle for opening the circuit in said connection with both said contact terminals upon application of said second needle to a piece-to-be-tested.

5. In combination with a flash-light of the type comprising a case, a bulb, a battery, a switch and an electric circuit including said battery, bulb and switch, and a circuit opening and closing socket device in said circuit; a testing attachment comprising a socket plug with contact terminals adapted upon insertion of the plug into the socket device to open the flash-light circuit and place said contact terminals therein, a first needle electrically connected with one of said contact terminals, a second needle electrically connected with both said contact terminals, means associated with said second needle for opening the circuit in said connection with both said contact terminals upon application of said second needle to a piece-to-be-tested, said last named means comprising a holder for said needle to which one of said second needle electric connections leads, the other said electric connection leading to said needle, an insulated guide for the needle in the holder, and means carried by the needle to contact said holder when the needle is in one position only.

6. In combination with a flash-light of the type comprising a case, a bulb, a battery, a switch and an electric circuit including said battery, bulb and switch, and a circuit opening and closing socket device in said circuit; a testing attachment comprising a socket plug with contact terminals adapted upon insertion of the plug into the socket device to open the flash-light circuit and place said contact terminals therein, a first needle electrically connected with one of said contact terminals, a second needle electrically connected with both said contact terminals, means associated with said second needle for opening the circuit in said connection with both said contact terminals upon application of said second needle to a piece-to-be-tested, said last named means comprising a holder for said needle to which one of said second needle electric connections leads, the other said electric connection leading to said needle, an insulated guide for the needle in the holder, means carried by the needle to contact said holder when the needle is in one position only, and means continuously tending to establish and maintain the contact between said needle and holder.

7. In combination with a flash-light of the type comprising a case, a bulb, a battery, a switch and an electric circuit including said battery, bulb and switch, and a circuit opening and closing socket device in said circuit; a testing attachment comprising a socket plug with contact terminals adapted upon insertion of the plug into the socket device to open the flash-light circuit and place said contact terminals therein, a first needle electrically connected with one of said contact terminals, a second needle electrically connected with both said contact terminals, means associated with said second needle for opening the circuit in said connection with both said contact terminals upon application of said second needle to a piece-to-be-tested, said last named means comprising a holder for said needle to which one of said second needle electric connections leads, the other said electric connection leading to said needle, an insulated guide for the needle in the holder, means carried by the needle to contact said holder when the needle is in one position only, and means continuously tending to establish and maintain the contact between said needle and holder, said continuously tending means comprising a coil spring located within the holder and engaging the needle.

Signed at the city of New York, in the county of New York and State of New York, this 26th day of October, 1928.

NATHANIEL ROE.